April 1, 1924.
L. J. CONNOLLY
HOOK FISH STRINGER
Filed May 31, 1923
1,489,194
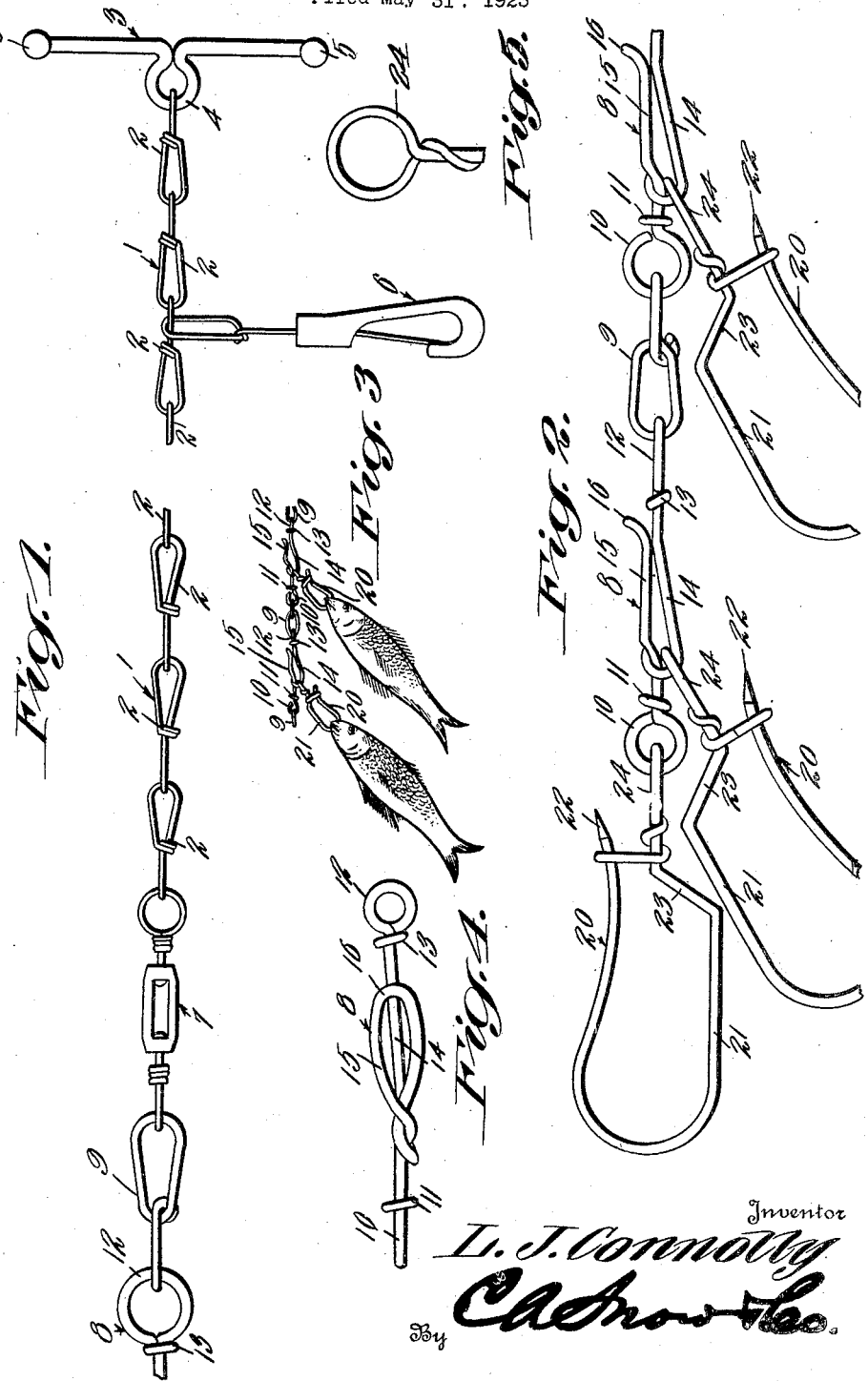
Inventor
L. J. Connolly
By C. A. Snow & Co.
Attorneys Patented Apr. 1, 1924.

1,489,194

UNITED STATES PATENT OFFICE.

LOUIS J. CONNOLLY, OF WAHPETON, NORTH DAKOTA.

HOOK FISH STRINGER.

Application filed May 31, 1923. Serial No. 642,598.

*To all whom it may concern:*

Be it known that I, LOUIS J. CONNOLLY, a citizen of the United States, residing at Wahpeton, in the county of Richland and State of North Dakota, have invented a new and useful Hook Fish Stringer, of which the following is a specification.

This invention relates to fishing apparatus and more particularly to stringers for holding the fish.

The object of the invention is to provide a device of this character so constructed that a person fishing from a boat can string a fish quickly and easily without injury to the fish or inconvenience to the fisherman and by means of which the fish are held in spaced relation to prevent jamming.

Another object is to provide a stringer of this character whereby the fish may have their lips pinned together in the boat by an attaching hook and then said hook detachably engaged with a chain hung over one side of the boat or towed behind it and thus avoiding stretching over the side of the boat or lifting the stringer outside of the water.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a portion of the stringer constituting this invention, parts being broken out for convenience and illustration.

Fig. 2 is an enlarged side elevation of the rear of the stringer showing the hooks for connecting the fish to the chain.

Fig. 3 is a detail showing a couple of fish suspended from the stringer; and

Fig. 4 is a detail plan view of one of the clip links.

Fig. 5 is a detail front elevation of a portion of the shank of one of the movable hooks.

The stringer constituting this invention comprises a lead chain 1 constructed of a plurality of flexibly connected nickel plated links 2 as shown in Fig. 1 and which is provided at one end with an attaching element 3 for connecting the chain to a support and which is here shown in the form of a bar having a loop 4 formed intermediate its ends and provided at its opposite ends with knobs 5. A snap hook 6 is also carried by this lead chain to connect it to a boat or other object or to confine the hooks not in use.

A swivel 7 connects the other end of the lead chain with the stringer proper here shown composed of a plurality of clip links 8 connected by double chain links 9. Any desired number of these clip links may be employed according to the length of the stringer and each comprises a piece of stiff wire having one end bent to form an eye 10 with its terminal wrapped around the body portion of the wire as shown at 11. The other end of the wire is also bent to form a loop or eye 12 having the terminal of the wire wrapped around the shank as shown at 13. The body portion of the wire between the loops thereof is bent to form a clip which comprises a fixed jaw 14 and a movable spring jaw 15 made in the form of a loop with its end deflected as shown at 16 to facilitate the entrance of the hook 20 used to connect a fish to the stringer.

Loosely mounted on the stringer and when not in use collected on the front end of the lead chain 1, is a plurality of suspending hooks 20 one of which is designed to be placed through the lips of the fish as shown in Fig. 3 and after being so engaged is slipped longitudinally outward on the chain and engaged with one of the clip links 8 as is shown clearly in Figs. 2 and 3.

Each of these hooks 20 are exactly alike and hence one only will be described in detail. Each hook 20 is constructed of a piece of heavy spring wire and is bent to form a loop 21, one side member of which has a pointed terminal 22 which is designed to pierce the lips of a fish to be suspended from the stringer. The inner end of the other side member is offset inwardly as shown at 23 and is then extended longitudinally and bent to form an attaching eye or loop 24. This loop 24 is of a size sufficient to permit it to slide freely over the various links of a stringer chain and to be engaged with one of the clip links 8 at any point desired. This connecting of a fish to a stringer by inserting a hook through the lips of the fish prevents the fish's mouth from being opened and the body thereof filled with water when the stringer is towed from the boat.

The arrangement of the hooks 20 which are not in use at the front end of the lead chain 1 adapts them to be easily accessible to the fisherman so that when the fish is caught all that is necessary is to take the outermost hook and after stringing a fish thereon as shown in Fig. 3 slide said hook outwardly on the chain until it reaches the clip link 8 on which it is designed to anchor.

One of these hooks 20 is shown secured to the outer end of the stringer while the other hooks are movably mounted thereon so that they can be slipped forward when desired or moved rearward for anchoring a fish at any desired point on the stringer. It is understood that all of the hooks 20 except the fixed end hook are kept at the inner end of the chain inside the boat where they are convenient to put the fish on without reaching over the side of the boat or lifting the stringer out of the water. This method of stringing fish avoids interference by flopping of the other fish already on the stringer. The use of these hooks eliminate the necessity of stringing fish through the gills or reaching out over the water to put them in a live box or onto a chain stringer having stationary hooks.

Various changes in the form, shape, proportion and other minor details of construction may be made without departing from the principle or sacrificing any of the advantages of the claimed invention.

I claim:—

1. A fish stringer comprising a chain having clips and a plurality of hooks slidably mounted on the chain and adapted to be detachably engaged with one of the clips.

2. A fish stringer comprising a lead chain having means for securing it to a support and an extension for attachment of the fish, said extension having flexibly connected clip links, and hooks for engaging the lips of the fish and having eyes slidable on the chain having detachable engagement with the clips.

3. A fish stringer comprising a lead chain having means for securing it to a support, an extension composed of flexibly connected clip links and a plurality of hooks having eyes slidable on said chain and adapted to be engaged with said clip links.

4. A stringer of the class described comprising a chain including a plurality of clip links each of which is composed of a piece of wire bent at its ends to form eyes and intermediate said ends between said eyes to form a spring clamping jaw to releasably receive a fish carrying hook.

In testimony that I claim the foregoing as my own, I have hereto affixed my signature in the presence of two witnesses.

LOUIS J. CONNOLLY.

Witnesses:
B. N. CONDIT,
A. J. CONNOLLY.